United States Patent

[11] 3,619,608

| | | |
|---|---|---|
| [72] | Inventor | Eugene R. Westerberg<br>Menlo Park, Calif. |
| [21] | Appl. No. | 847,326 |
| [22] | Filed | Aug. 4, 1969 |
| [45] | Patented | Nov. 9, 1971 |
| [73] | Assignee | Stanford Research Institute<br>Menlo Park, Calif. |

[54] MULTIPLE IMAGING CHARGED PARTICLE BEAM EXPOSURE SYSTEM
7 Claims, 2 Drawing Figs.

[52] U.S. Cl. .................................. 250/49.5 C,
29/25.3, 148/1.5, 250/49.5 TE, 250/49.5 T,
313/85, 315/31, 346/74 CR
[51] Int. Cl. .................................................. H01j 37/12
[50] Field of Search .......................................... 29/25.3;
148/1.5; 219/121 EB; 313/80, 85, 86; 315/30, 31;
317/234; 340/173; 346/74; 250/49.5 TI, 49.5 R,
49.5 TE, 49.5 C

[56] References Cited
UNITED STATES PATENTS

| | | | | |
|---|---|---|---|---|
| 2,862,144 | 11/1958 | McNaney | | 315/30 |
| 3,331,985 | 7/1967 | Hamann | | 315/31 X |
| 3,491,236 | 1/1970 | Newberry | | 250/49.5 TI |

Primary Examiner—Anthony L. Birch
Attorney—Urban H. Faubion

ABSTRACT: An electron source illuminates a pattern mask having a desired aperture pattern therein. Electrons passing through the pattern mask impinge upon a mesh screen. A high-voltage electrical source is connected between the mesh screen and an electron-sensitive resist coated substrate to produce a strong electrical field therebetween. Each hole in the mesh screen acts as an electron lens for producing an image of the pattern mask on the electron-sensitive resist, thus resulting in an array of exposed images on the electron-sensitive resist. Alternatively, an ion source may be used with an ion-sensitive resist coated substrate or ions may be implanted directly into a substrate.

MULTIPLE IMAGING CHARGED PARTICLE BEAM EXPOSURE SYSTEM

BACKGROUND OF THE INVENTION

1. Field of the Invention

This invention relates to an electron or ion exposure system and more particularly to such a system for forming multiple images.

2. Description of the Prior Art

The exposure of an electron-sensitive resist with an electron beam to form a pattern which can be selectively etched is a well-known method of micromachining thin films. For positive resists the areas exposed to electrons are subsequently selectively removed by a chemical or thermal process, whereas for negative resists the unexposed areas are removed. In either case, the process leaves a mask of chemically resistant material in the desired pattern, thereby providing a means of selectively etching the patterns in materials on which the resist is applied.

The production of such resist patterns with electron beams has a number of advantages over similar production using exposure with light. The useful range of photon wavelength limits practical resolutions of photoresists to the order of a micron, whereas the wavelength of electrons used in resist exposure is $10^4$ times smaller, thus enabling a corresponding increase in resolution. Another advantage in using electron beams over light is that electrons can be easily deflected electronically to produce intricate patterns, but photons cannot be maneuvered in a similarly simple manner.

Many applications require that regular, closely packed arrays of essentially identical patterns be produced on a substrate. This is usually done by using a high resolution electron optical system either to form and deflect a fine electron beam over the resist area in appropriate fashion or to form an image of a basic pattern on the resist by electron optical projection and demagnification of a suitable pattern mask. In either case, the usable field size of the electron optical system consistent with the resolution required limits the total resist area that can be accommodated. Thus, if larger areas of repetitive patterns are required, a step and repeat process is usually employed in which the position of the substrate relative to the electron optical system (or vice versa) is physically shifted between exposures. Such a step and repeat process is inefficient and the physical displacement involved creates alignment difficulties.

SUMMARY OF THE INVENTION

Accordingly, it is an object of this invention to provide an electron or ion exposure system for producing regular arrays of closely spaced pattern images over relatively large substrate areas without requiring physical displacements.

It is a more specific object of this invention to provide an array of simple electronic lenses for producing regular arrays of closely spaced pattern images over relatively large substrate areas without requiring physical displacements.

According to one form of the invention, a mask having a desired aperture pattern is illuminated by an exposure beam which may comprise either electrons or ions. The electrons or ions emerging from the aperture mask impinge upon a mesh screen spaced from the aperture mask. A strong electrical field is applied between the mesh screen and a spaced target surface. Each hole in the mesh screen acts as an electron lens to focus the electrons and produce an array of demagnified images of the aperture mask on the target surface.

The novel features which are believed to be characteristic of the invention are set forth with particularity in the appended claims. The invention itself, however, both as to its organization and method of operation, together with further objects and advantages thereof, may best be understood by reference to the following description taken in connection with the accompanying drawings.

DESCRIPTION OF THE PREFERRED EMBODIMENTS

Figures 1, 2:
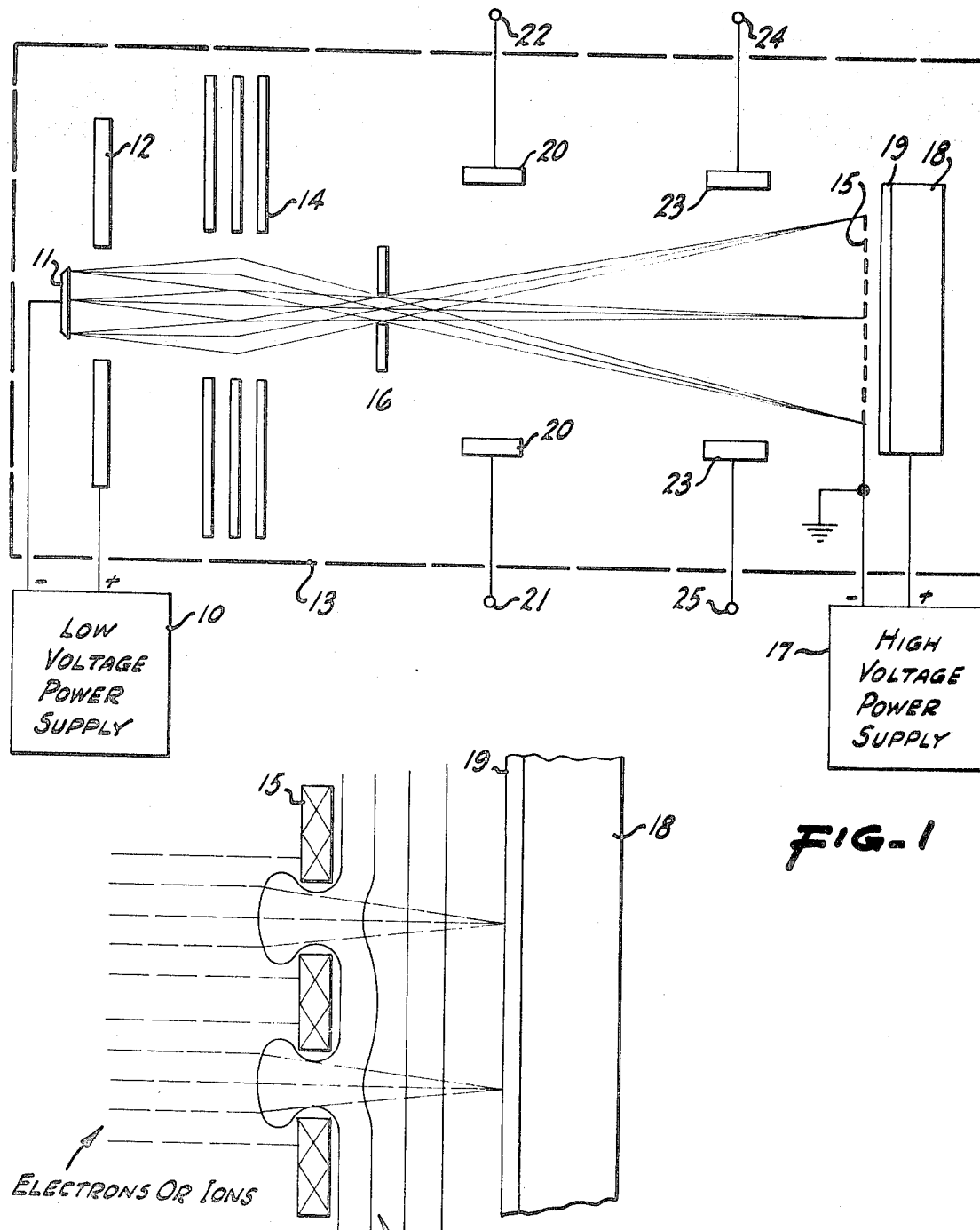
FIG. 1 is a diagrammatic illustration partly in cross section of an electron beam resist exposure system constructed in accordance with the principles of this invention.
FIG. 2 is an enlarged illustration of a portion of the mesh screen and substrate of FIG. 1 showing how each hole in the mesh screen acts as an electron lens.

Referring now to FIG. 1, there is shown one of the preferred embodiments of the invention. A low-voltage power supply 10 is connected between a circular cathode 11 and a circular, apertured anode 12 which are disposed within a vacuum chamber 13. The vacuum chamber 13 may be any of the well-known vacuum enclosures which may be evacuated, for example, to $10^{14}$ Torr, and the circular cathode is typically one-eighth inch in diameter. The cathode 11 produces electrons which pass through anode 12 and are imaged by a suitable electron lens 14, illustrated in FIG. 1 as a three-electrode unipotential or "einzel" lens, onto a mesh screen 15. A pattern mask 16 which contains an aperture pattern which is to be reproduced is placed at the focal point of the lens 14. This positioning insures that the cones of electrons passing through the pattern mask 16 overlap at the mesh screen 15 to produce an even illumination. The intensity distribution of the electrons at the pattern mask 16 is of a Gaussian shape, but by using only that portion of the pattern mask near the peak of the distribution, the illumination is nearly constant across the apertured portion of pattern mask 16.

A high-voltage power supply 17 (on the order of 1.5–3 kv.) is connected between the mesh screen 15 and a substrate 18. The substrate 18 has, in a first embodiment, a target surface or coating 19 of electron-sensitive resist, examples of which are well known in the art. As is explained in more detail hereinafter in connection with FIG. 2, the mesh screen 15 acts as a plurality of electron lenses for imaging electrons on the resist coating 19 of substrate 18 in patterns having the same shape as the aperture pattern in the pattern mask 16.

Alternate arrangements are possible in the system of FIG. 1. For example, if source 11 is made to be an ion rather than electron source, and an ion-sensitive resist is used for coating 19, then multiple ion images of the aperture pattern in pattern mask 16 are produced on coating 19 by the mesh screen 15. Since the system of FIG. 1 is wholly electrostatic, the paths taken by the ions are identical to those traversed by the electrons; the ions just travel those trajectories at lower velocities. Positive ions, of course, require the signs of the voltages applied by low-voltage power supply 10 and high-voltage power supply 17 be reversed.

If desired, patterns can be etched into the substrate material 18 directly, without exposing a resist layer and later developing it. This is done by using the ion beam to sputter away the substrate material. Hence, micromachining of thin films can be done directly and arrays of devices produced from a single pattern mask 16. Even more importantly, such an arrangement can be used for producing arrays of ion-implanted semiconductor devices by applying from high-voltage power supply 17 a voltage on the order of 20–100kv. in order to obtain deep penetration of the ions in the substrate 18.

Still referring to FIG. 1, a set of deflection plates 20 connected to terminals 21 and 22 may be used if desired to align the beam illuminating the mesh screen 15. In this case terminals 21 and 22 are connected to a voltage source (not shown) with the polarity dependent upon the direction the beam is to be deflected.

Another set of deflection plates 23 which are connected to terminals 24 and 25 can be used to displace the beam impinging on the substrate 18 or the resist coating 19 thereon by predetermined amounts and directions. Terminals 24 and 25 are connected to a voltage source (not shown) with the polarities dependent upon the direction the beam is to be deflected. One use of deflection plates 23, for example, is for generating denser arrays of patterns. Suppose that the multiple images of the aperture in pattern mask 16 which are formed on the coating 19 (or on substrate 18 if no coating is utilized) are spaced $12\mu$ apart, center-to-center, and that each image covers an area of $1\mu^2$. The deflection plates 23 can then be used to displace the images in successive steps as small as $1\mu$ to perform multiple exposures and thereby decrease the spaces between images.

Referring now to FIG. 2, there is shown in cross section an enlarged view of a portion of the mesh screen 15 and substrate 18 with, for example, resist coating 19 thereon. Due to the accelerating voltage applied between the mesh screen 15 and the substrate 18, low energy electrons or ions directed toward the side of the mesh screen 15 remote from the substrate from a pattern suitably illuminated with electrons or ions are drawn through each hole in the mesh screen 15 by the accelerating voltage and focused on the target surface or resist 19, or on the substrate 18 if a resist is not used, with each hole of the screen acting as an electron lens. Thus, a multitude of identical images of an illuminated pattern, one image for each hole, is produced.

In a specific example of an apparatus constructed in accordance with the principles of this invention, as in FIG. 1, an electron-sensitive resist is used (polymethylmethacrylate) for coating 19 and source 11 is an electron source. The low-voltage power supply 10 supplies 350 volts and the high-voltage power supply 17 supplies 2.5 kv. The distance between the pattern mask 16 and the mesh screen 15 is approximately 20 inches and the distance between the mesh screen 15 and the resist coating 19 is 0.22 inches. The mesh screen 15 is made of nickel and has approximately 2,000 holes per linear inch. Any shape of holes may be used, but it has been found that round holes produce the least amount of distortion. The holes have a diameter of $6\mu$ and are spaced on $12\mu$ centers.

With such an apparatus it is possible to produce large, dense arrays of patterns. The resolution of the process is very great because the angular aperture of each lens is small due to the small size of each screen hole and the large distance between the mesh screen 15 and the pattern mask 16. In the specific example discussed above, this angle was on the order of $10^{15}$ radians. The uniformity of the images formed over the array is quite good because of the small illumination angle over the entire array. This illumination angle was approximately $10^{12}$ radians in the specific example discussed above. Each of the holes or lens in the mesh screen is capable of resolution in excess of 5,000 A. and demagnifications of objects by up to 250 times may be obtained. The specific example discussed above had about $10^6$ lenses acting in parallel and even larger arrays are easily constructed.

While particular embodiments of the invention have been shown and described, it will of course be understood that the invention is not limited thereto, since many modifications to apparatus described may be made without departing from the principles of the invention. It is contemplated that the appended claims will cover any such modifications as fall within the true spirit and scope of the invention.

What is claimed is:

1. A multiple image exposure system comprising:
  a. an exposure beam directed along a path;
  b. a pattern mask having a predetermined aperture pattern therein and placed in the path of said exposure beam;
  c. a multiple lens means spaced from said pattern mask, said multiple lens means consisting of a mesh screen spaced from said pattern mask and formed of a unitary planar conducting plate having a plurality of openings formed therein;
  d. a target surface positioned adjacent said mesh screen; and
  e. a voltage source for biasing said target surface with respect to said mesh screen whereby each of said openings of said mesh screen acts as a lens for imaging said exposure beam onto said target surface in a pattern identical in configuration to but reduced in size from said predetermined aperture pattern in said pattern mask so that a plurality of images of said predetermined aperture pattern, one for each hole in said mesh screen, is formed on said target surface.

2. A multiple image exposure system as claimed in claim 1 in which said exposure beam comprises an electron beam and in which said target surface comprises an electron-sensitive resist coating on a substrate.

3. A multiple image exposure system as claimed in claim 1 in which said exposure beam comprises an ion beam and in which said target surface comprises an ion-sensitive resist coating on a substrate.

4. A multiple image exposure system as claimed in claim 1 in which said exposure beam comprises an ion beam and in which said target surface comprises a semiconductor material adapted to be doped by said ion beam.

5. A multiple exposure system as claimed in claim 1 in which said exposure beam comprises an ion beam and in which said target surface comprises a substrate adapted to be sputtered away by said ion beam.

6. A multiple image exposure system as claimed in claim 1 further including deflection electrodes disposed along the path of said exposure beam between said pattern mask and said mask screen for displacing said exposure beam with respect to said mesh screen.

7. A multiple image exposure system as claimed in claim 1 further including an equipotential lens for imaging said exposure beam on said mesh screen, and wherein said pattern mask is placed at the focal point of said equipotential lens.

* * * * *